United States Patent [19]

Petrella

[11] Patent Number: 5,725,344

[45] Date of Patent: Mar. 10, 1998

[54] POSITIONING DEVICE AND METHOD OF USE

[75] Inventor: Frank P. Petrella, Burbank, Calif.

[73] Assignee: G. W. Lisk Company, Inc., Clifton Springs, N.Y.

[21] Appl. No.: 794,776

[22] Filed: Feb. 1, 1997

Related U.S. Application Data

[60] Provisional application No. 60/011,414 Feb. 9, 1996.

[51] Int. Cl.[6] .......................... F16B 39/04; F16B 39/22
[52] U.S. Cl. ........................ 411/299; 411/316; 411/949
[58] Field of Search .......................... 411/7, 296, 299, 411/304, 306, 316, 949

[56] References Cited

U.S. PATENT DOCUMENTS

| | | | |
|---|---|---|---|
| 902,646 | 11/1908 | Conn | 411/299 |
| 922,261 | 5/1909 | Clay | 411/949 X |
| 2,666,456 | 1/1954 | Blanchard | 411/949 X |
| 2,730,154 | 1/1956 | Aspey | 411/949 X |
| 3,208,493 | 9/1965 | Holmes | 411/949 X |

*Primary Examiner*—Neill R. Wilson
*Attorney, Agent, or Firm*—Timothy T. Tyson; Ted Masters

[57] ABSTRACT

A positioning device (20) which permits precise adjustment and retention of the longitudinal position of a screw member (30) within a threaded receptacle (22) in incremental detent steps includes the screw member (30) having at least one spring member (42) and the threaded receptacle (22) having a plurality of circumferentially spaced longitudinal grooves (28). As the screw member (30) is rotated within the threaded receptacle (22), the spring member (42) sequentially engages the spaced longitudinal grooves (28) in incremental detent steps. The engagement between the spring member (42) and a longitudinal groove (28) retains the screw member (30) in a desired detent position, thereby resisting unwanted rotation as from vibration or thermal cycling.

1 Claim, 4 Drawing Sheets

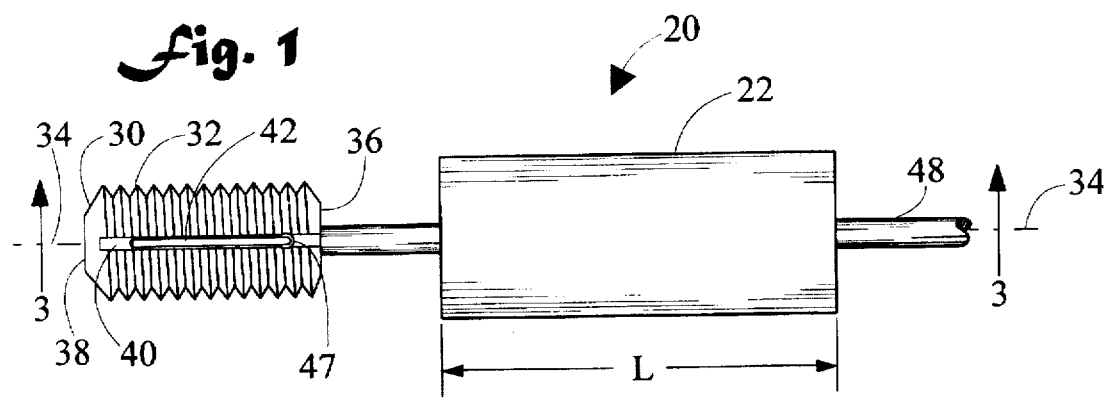
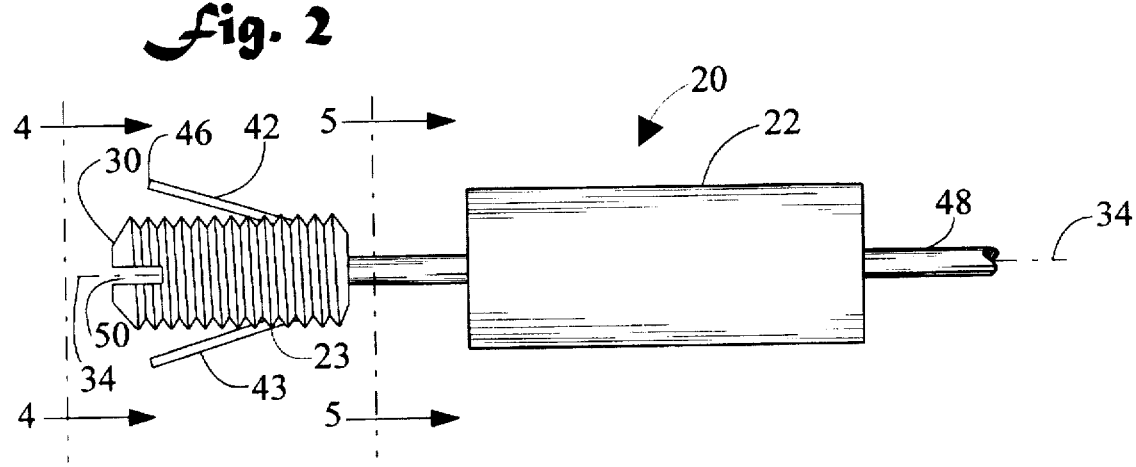
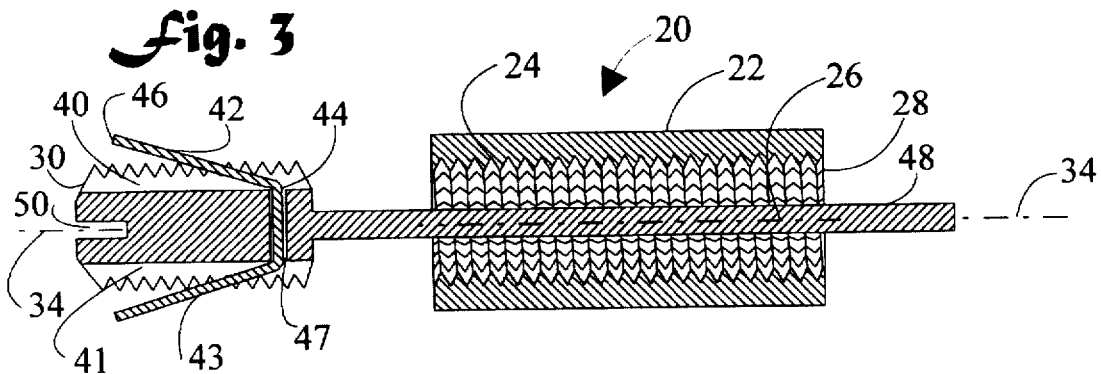

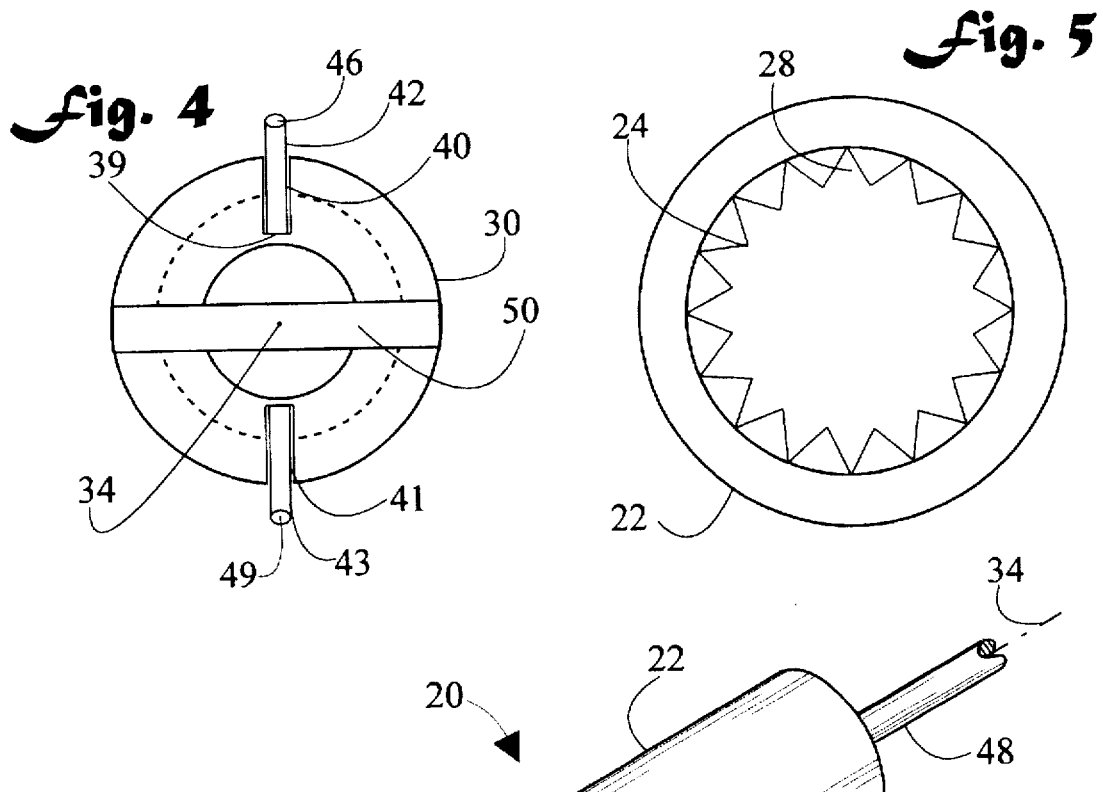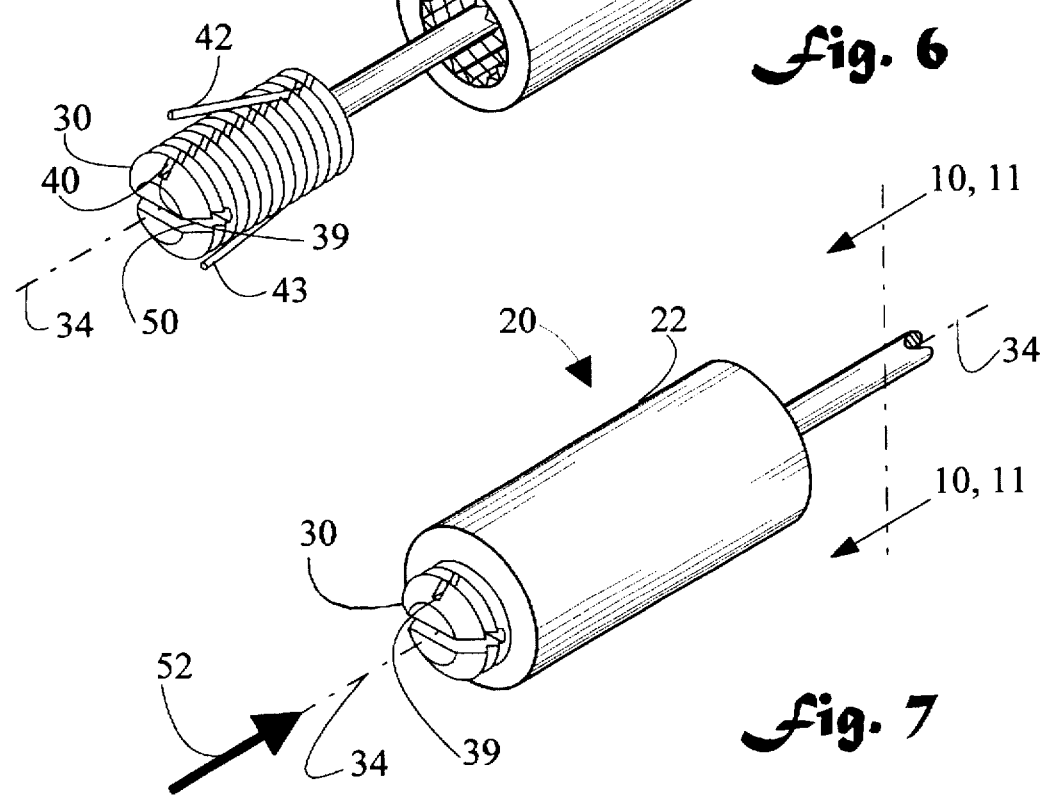

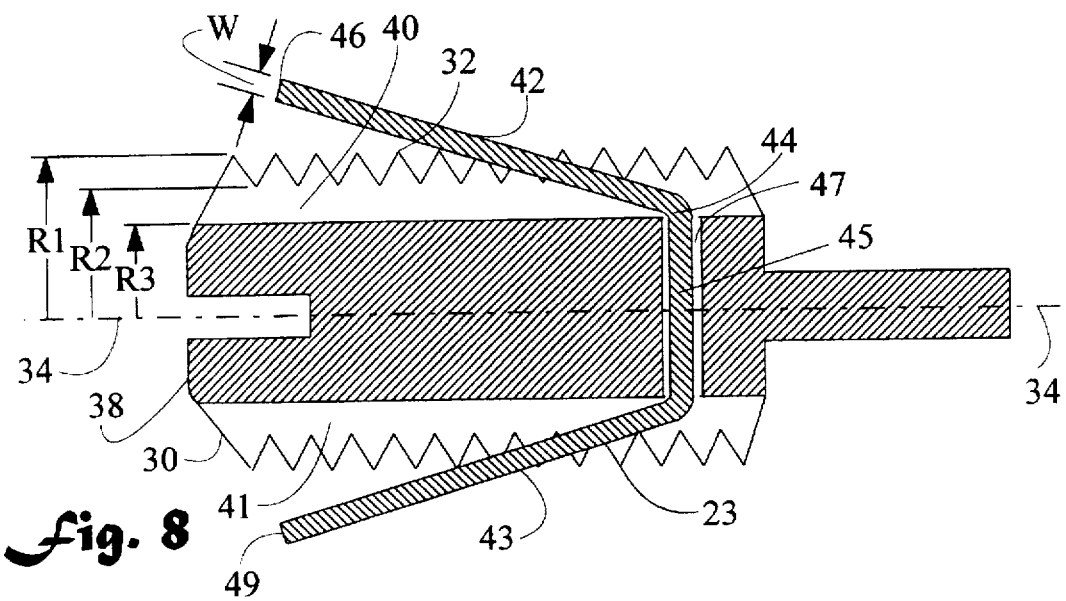
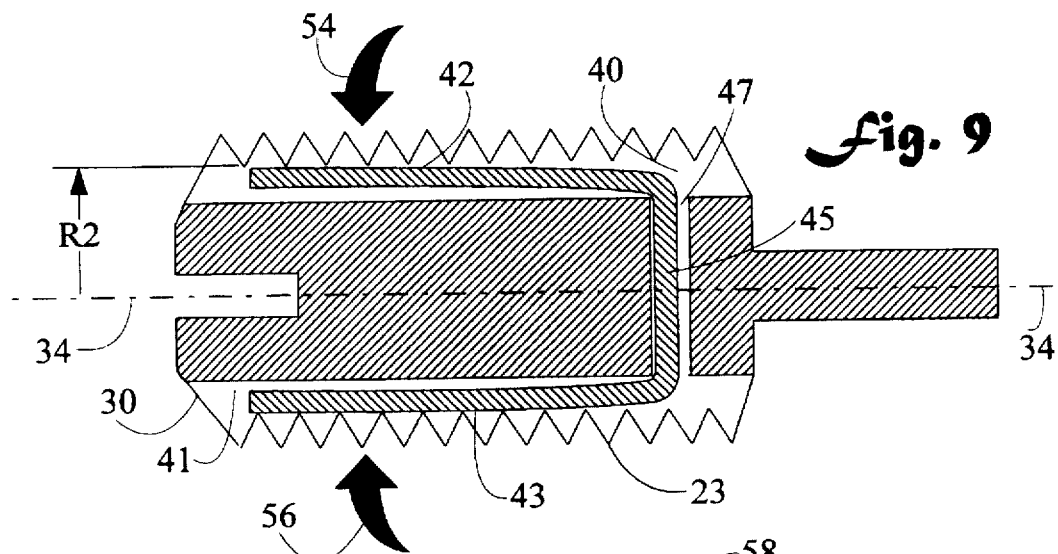
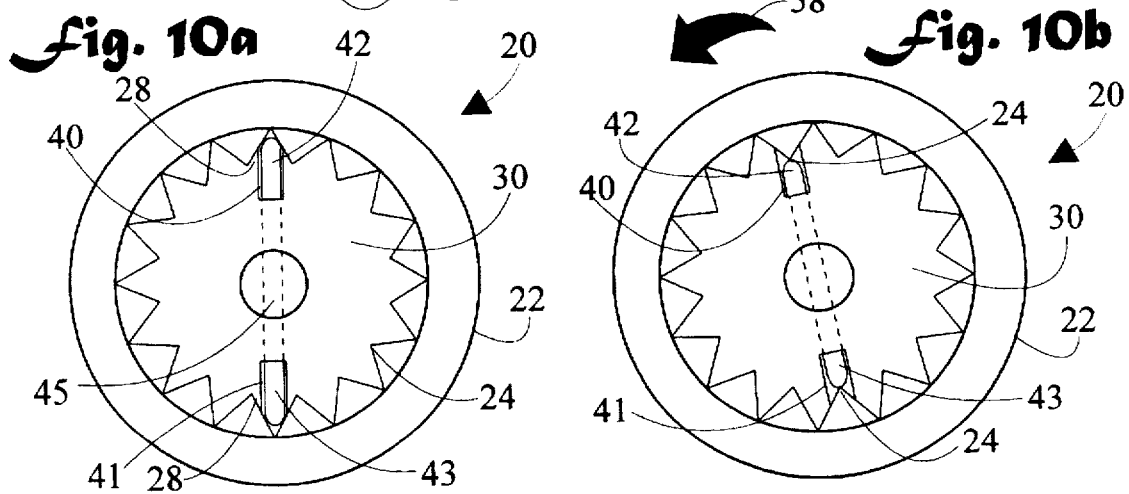

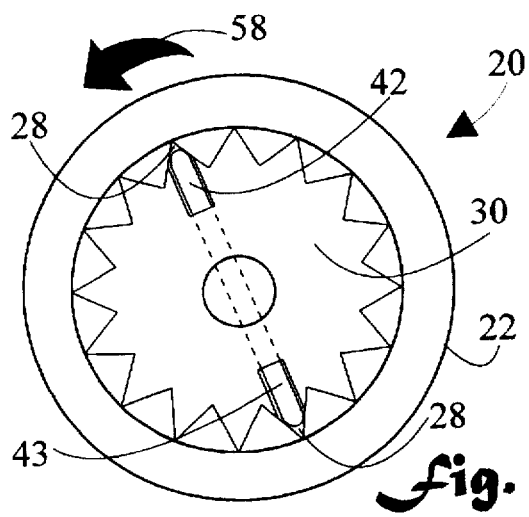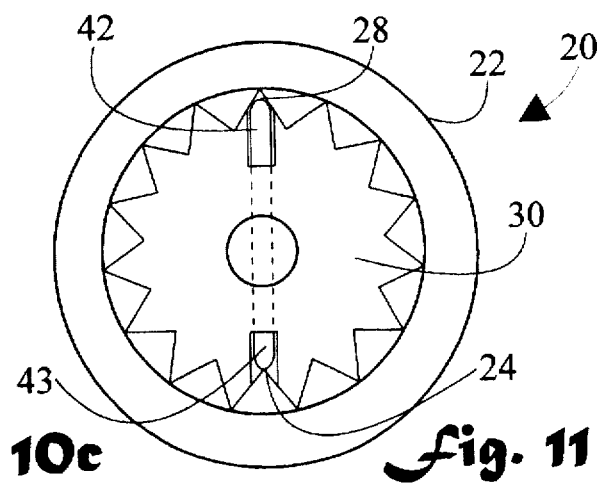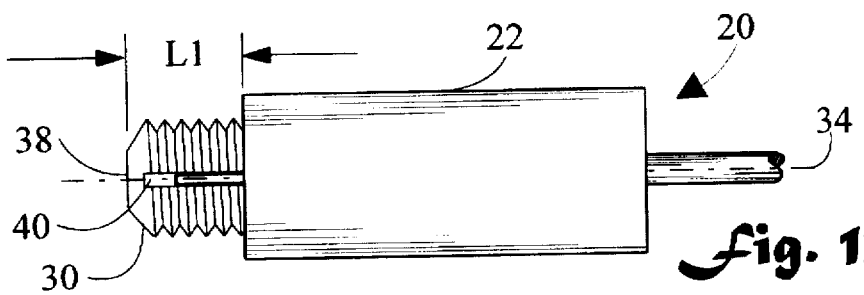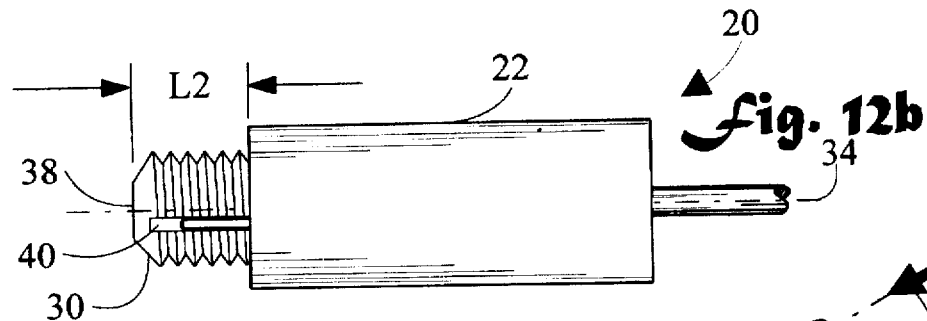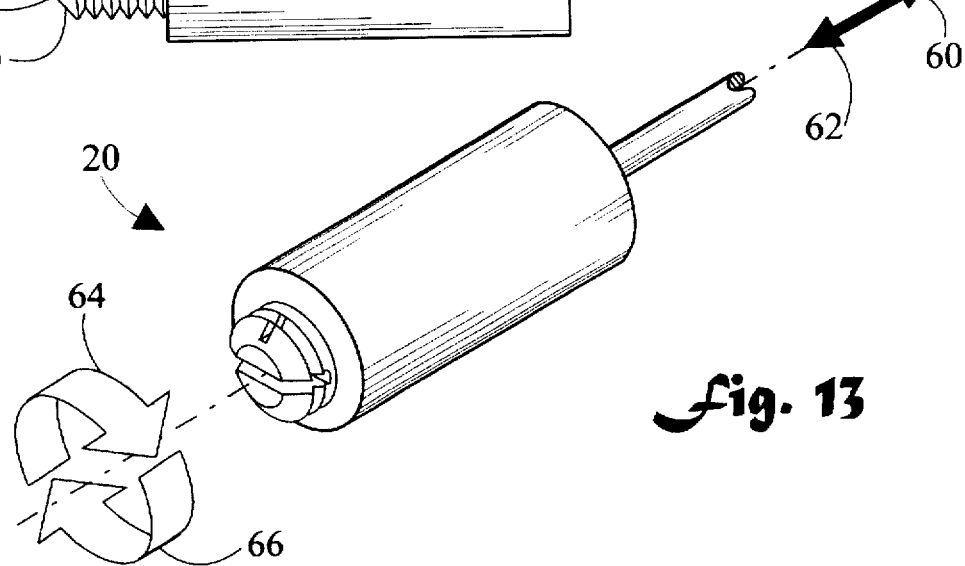

(1)

POSITIONING DEVICE AND METHOD OF USE

CROSS REFERENCE TO RELATED APPLICATION

This application is a provisional U.S. patent application Ser. No. 60/011,414, filed on Feb. 9, 1996, the contents of which are incorporated herein by reference.

TECHNICAL FIELD

The present invention pertains to positioning devices which precisely control the relative position of two components, and in particular to a positioning device which permits precise adjustment of the longitudinal position of a screw member within a receptacle in incremental detent steps.

BACKGROUND ART

The present invention relates to a positioning device for precisely adjusting and retaining the longitudinal position of a screw member in incremental detent steps within a threaded receptacle, as might be employed in instrumentation devices such as position transducers. A typical example of a positioning transducer is the Linear Variable Differential Transducer (LVDT) used to provide an electrical signal indication of the position of a hydraulic servoactuator. The magnetic core of the transducer is usually carried inside its associated sensing coil by means of a rod which is attached to the actuator piston by a screw. The core must be precisely adjusted so that the transducer is nulled at a set actuator position, and the adjustment must not be shifted by vibration or thermal cycling. Jam nuts have sometimes been used, but they are unreliable, usually require special tools such as hollow wrenches to effect the desired adjustment, and may shift the adjustment as they are tightened.

Alternatives to jam nuts are a mechanical friction device such as a nut with a Nylon or fiber insert or a locking Helicoil having a threaded insert with a deformed member which must be sprung aside as the screw is turned into it. These devices are easy to use since they do not require any discrete locking action on the part of the person making the adjustment, but they are considered suspect after repeated adjustments since they must lose their essential friction.

Another example of the need for precision longitudinal positioning devices are the rotor pitch control rods used in helicopters. These rods couple the swash plate to the rotatable blades in order to change the pitch of the blades. Longitudinal adjustment of the control rods is required to allow for manufacturing tolerances in the system and to tune individual blades when a new blade set is fitted. This adjustment is classically provided by adjustable struts locked by lock nuts requiring spanners or special tools in order to effect the necessary adjustment.

U.S. Pat. No. 5,431,540 shows a main rotor pitch control rod subassembly including an upper rod end segment having a bearing subassembly, a lower rod end segment having a bearing subassembly, and an eccentric bushing disposed in rotatable combination with the upper rod end segment bearing subassembly for varying the axial length of the pitch control rod subassembly. To vary the axial length of the pitch control rod subassembly, the eccentric bushing is rotated about the upper rod end segment bearing subassembly to a predetermined position where a bushing aperture aligns with a key aperture. A locking bolt is inserted through the aligned apertures to lock the eccentric bushing in the predetermined position.

U.K. Patent 2,098,299 shows a longitudinally adjustable strut particularly suited for use as a control rod in a helicopter flying control system. The longitudinally adjustable strut has an adjusting sleeve threadably engaged with two oppositely handed threaded rod parts. A handwheel is rotationally fixed to the adjusting sleeve and a locking lever, pivotally attached to the handwheel, has an inwardly facing tang adapted for selective engagement in any one of a plurality of slots around a peripheral region of the one rod part. Retention means are provided to selectively retain the locking lever in an engaged position.

DISCLOSURE OF INVENTION

The present invention is directed to a positioning device which permits precise adjustment of the longitudinal position of a screw member within a threaded receptacle in incremental detent steps. The positioning device includes a screw member having at least one spring member and a threaded receptacle having a plurality of circumferentially spaced longitudinal grooves. As the screw member is rotated within the threaded receptacle, the spring member sequentially engages the spaced longitudinal grooves in incremental detent steps. The engagement between the spring member and a longitudinal groove retains the screw member in a desired detent position, thereby resisting unwanted rotation as from vibration or thermal cycling.

The positioning device is useful in precisely adjusting and retaining the longitudinal position of the screw member with respect to the fixed receptacle, and finds application in any circumstance where adjustment and retention in a precise longitudinal position is required. Numerous technologies ranging from instrumentation to helicopter rotors could benefit from the teachings of the present invention.

In accordance with a preferred embodiment of the present invention, the positioning device has a threaded receptacle, the receptacle having first threads longitudinally extending around a first central axis. The first threads have a plurality of circumferentially spaced longitudinal grooves. A screw member has second threads sized to threadably engage the first threads of the threaded receptacle. The second threads longitudinally extending around a second central axis. The screw member has a tip end for insertion into the threaded receptacle, and an opposite head end. The second threads have an outer thread radius and an inner thread radius, the radii measured from the second central axis. The screw member has at least one longitudinal slot penetrating the second threads, the slot having a bottom portion located at a bottom radius from the second central axis which is less than the inner thread radius. An elongated spring member has a first end and an opposite second end, the first end is fixedly positioned in the slot and extends toward the head end of the screw member. The second end is outwardly biased away from the second central axis. The spring member has a radial width which is equal to or less than the difference between the inner radius and the bottom radius. When the screw member is rotatably inserted into and threadably engages the threaded receptacle, the spring member sequentially engages the spaced longitudinal grooves in incremental detent steps.

In accordance with an important feature of the invention, the engagement between the spring member and one longitudinal groove retains the screw member in a desired detent position, thereby resisting unwanted rotation of the screw member as from vibration or thermal cycling.

In accordance with an important aspect of the invention, the screw member and the threaded receptacle have "N"

threads per inch, and the threaded receptacle has "M" equally spaced longitudinal grooves, the longitudinal position of the screw member within the threaded receptacle is longitudinally adjustable in longitudinal position increments (ΔL) according to the formula:

$$\Delta L = 1/(N \times M).$$

In accordance with a feature of the invention, the threaded receptacle has a length L, wherein the tip end of the screw member may longitudinally traverse the entire length L of the threaded receptacle.

In accordance with an aspect of the invention, the longitudinal grooves are substantially V-shaped.

In accordance with another feature of the invention, the spring member is fabricated from wire.

In accordance with an important feature of the invention, the screw member has two circumferentially opposite longitudinal slots, one slot having a fixedly positioned first spring member, and the opposite slot having a fixedly positioned second spring member. The screw member has a radially oriented through hole. The through hole is substantially coplanar with the two circumferentially opposite longitudinal slots. The first and second spring members are connected by an integral central section with the central section disposed within the through hole.

In accordance with another aspect of the invention, the number of longitudinal grooves are odd, so that at one time only one spring member engages a longitudinal groove in the threaded receptacle.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a top plan view of a positioning device in accordance with the present invention;

FIG. 2 is a side elevation view of the positioning device;

FIG. 3 is a cross sectional view along the line 3—3 of FIG. 1;

FIG. 4 is an enlarged end view of the screw member along line 4—4 of FIG. 2;

FIG. 5 is an enlarged end view of the threaded receptacle along the line 5—5 of FIG. 2, showing the plurality of circumferentially spaced longitudinal grooves;

FIG. 6 is a perspective view of the positioning device;

FIG. 7 is a perspective view of the positioning device with the screw member inserted into and threadably engaging the threaded receptacle;

FIG. 8 is an enlarged cross sectional view of the screw and spring unit showing the spring members outwardly biased away from the second central axis of the screw member;

FIG. 9 is an enlarged cross sectional view of the screw and spring unit showing the spring members being urged inwardly by the threads of the threaded receptacle;

FIG. 10a is an enlarged end view along the line 10—10 of FIG. 7;

FIG. 10b is an enlarged end view similar to FIG. 10a, with the screw member rotated between detent positions;

FIG. 10c is an enlarged end view similar to FIG. 10b, with the screw member rotated to the next sequential detent position;

FIG. 11 is an enlarged end view along the line 11—11 of FIG. 7 showing the threaded receptacle having an odd number of longitudinal grooves;

FIG. 12a is a top plan view of the screw member threadably engaging the threaded receptacle;

FIG. 12b is a top plan view of the screw member turned clockwise one detent increment; and, FIG. 13 is a perspective view of the positioning device showing the change in the longitudinal position of the screw member as the screw member is rotated clockwise or counterclockwise.

MODES FOR CARRYING OUT THE INVENTION

Referring initially to FIGS. 1, 2, and 3, there are illustrated top plan, side elevation, and cross sectional views respectively of a positioning device in accordance with the present invention, generally designated as 20. Positioning device 20 includes a threaded receptacle 22 and a screw and spring unit 23 having a screw member 30 and a spring member 42.

The threaded receptacle 22 has first threads 24 longitudinally extending around a first central axis 26. First threads 24 have a plurality of circumferentially spaced longitudinal grooves 28 (refer also to FIG. 5). In a preferred embodiment, longitudinal grooves 28 are substantially V-shaped, however numerous other shapes such as semicircular, substantially U-shaped, or trapezoidal could also be employed.

Threaded receptacle 22 is shown as a cylinder in FIGS. 1, 2, and 3. It is shown in this form for ease of illustration and is not limited to this configuration. While some situations may be able to utilize a cylindrical configuration for threaded receptacle 22, it will be appreciate that the more usual form will be a threaded hole in a larger object such as a piece of equipment. If threaded receptacle has the form shown in FIGS. 1, 2, and 3, it can be press fitted, shrink fitted, glued, or threaded into a larger object.

The screw member 30 has second threads 32 sized to threadably engage first threads 24 of threaded receptacle 22. Second threads 32 longitudinally extend around a second central axis 34. It is noted, that while first central axis 26 and second central axis 34 are separate and distinct, when screw member 30 is rotationally inserted into threaded receptacle 22, first central axis 26 and second central axis 34 are coincident.

Screw member 30 has a tip end 36 for insertion into threaded receptacle 22, and an opposite head end 38. Second threads 32 have an outer thread radius R1 and inner thread radius R2 measured from second central axis 34 (refer to FIG. 8). Screw member 30 has at least one longitudinal slot 40 which penetrates second threads 32 (refer also to FIG. 4). In a preferred embodiment, the screw member has two circumferentially opposite longitudinal slots 40 and 41. Slot 40 has a bottom portion 39 which is located at a bottom radius R3 from said second central axis, bottom radius R3 being less than inner thread radius R2.

Elongated spring member 42 has a first end 44 and a second end 46 (refer also to FIG. 8). First end 44 is fixedly positioned in slot 40, with second end 46 extending toward head end 38 and being outwardly biased away from second central axis 34. In a preferred embodiment, positioning device 20 utilizes two circumferentially opposite spring members 42 and 43 which are formed by a single bent wire (spring device) having an integral central section 45 which is centrally disposed within a radially oriented through hole 47 in screw member 30, spring member 42 being fixedly positioned in longitudinal slot 40, and spring member 43 being fixedly positioned in longitudinal slot 41. Through hole 47 is substantially coplanar with longitudinal slots 40 and 41. (refer also to FIG. 8). Spring member 42 has a radial width W which is less than or equal to the difference between inner thread radius R2 and bottom radius R3. In mathematical terms, W≦R2–R3. This design allows spring member 42 to be resiliently urged by first threads 24 into slot 40 and reside inside inner thread radius R2 (refer also to FIG. 9).

When screw and spring unit 23 is rotatably inserted into and screw member 30 threadably engages threaded receptacle 22, the spring member 42 sequentially engages spaced longitudinal grooves 28 in incremental detent steps (refer also to FIGS. 10 and 11). That is, as screw member 30 is rotated, spring member 42 moves from one longitudinal groove 28 to the next longitudinal groove 28 "clicking" into a detent position within each longitudinal groove 28. The engagement between spring member 42 and one longitudinal groove 28 retains screw member 30 in a desired detent position, thereby resisting unwanted rotation of screw member 30 as from vibration or thermal cycling. As screw member 30 is rotated, spring member 42 is urged out of longitudinal groove 28 and into slot 40. Continued rotation of screw member 30 causes spring member 42 to enter the next sequential longitudinal groove 28. The above mentioned sequence is depicted graphically in FIGS. 10a, 10b, and 10c. In a preferred embodiment, threaded receptacle 22 has a length L, wherein tip end 36 of screw member 30 may longitudinally traverse the entire length L of threaded receptacle 22, without encountering any impediment such as from stops or locking elements.

Tip end 36 of screw member 30 includes an integral elongated axial member 48 oriented along second axis 34 which interacts with any other element requiring the precise longitudinal positioning provided by positioning device 20. One example is the use of axial member 48 to position a transducing means which precisely detects the longitudinal position of screw member 30 within threaded receptacle 22. Screw member 30 is rotatably adjusted until it is longitudinally positioned to a desired location within the threaded receptacle 22 as measured by the transducing means. Head end 38 of screw member 30 includes an adjustment slot 50 coplanar with second axis 34 to facilitate the adjustment process. Another example is to use axial member 48 to position a mechanical device such as a helicopter rotor pitch control rod. It will be appreciated that the use of the positioning device 20 is not limited to those products described herein but may be used in any product requiring precise longitudinal positioning.

FIG. 4 is an enlarged end view of screw member 30 along line 4—4 of FIG. 2. Spring members 42 and 43 are aligned with slots 40 and 41 respectively, with ends 46 and 49 outwardly biased away from second central axis 34.

FIG. 5 is an enlarged end view of threaded receptacle 22 along the line 5—5 of FIG. 2, showing the plurality of circumferentially spaced longitudinal grooves 28.

FIG. 6 is a perspective view of positioning device 20 showing screw member 30 positioned for insertion into threaded receptacle 22.

FIG. 7 is a perspective view of positioning device 20 with the screw member 30 inserted in direction 52 into and threadably engaging threaded receptacle 22.

FIG. 8 is an enlarged cross sectional view of screw and spring unit 23 showing spring members 42 and 43 outwardly biased away from the second central axis 34 of screw member 30. In this view, screw and spring unit 23 has not been inserted into threaded receptacle 22. See also discussion above in conjunction with FIGS. 1, 2, and 3.

FIG. 9 is an enlarged cross sectional view of screw and spring unit 23 showing spring members 42 and 43 being urged inwardly in directions 54 and 56 respectively by the threads of the threaded receptacle 22 (not shown). In this view, screw and spring unit 23 has been inserted into threaded receptacle 22.

FIG. 10a is an enlarged end view along the line 10—10 of FIG. 7. Spring members 42 and 43 resiliently reside in detent positions in two circumferentially opposite longitudinal grooves 28 in receptacle 22.

FIG. 10b is an enlarged end view similar to FIG. 10a, with the screw member 30 rotated in direction 58 (counterclockwise as viewed from tip end 38) to a location in between detent positions. Spring members 42 and 43 are now forced into slots 40 and 41 respectively by threads 24 of threaded receptacle 22.

FIG. 10c is an enlarged end view similar to FIG. 10b, with the screw member 30 further rotated to the next sequential detent position. Screw member 30 has been rotated in direction 58, and spring members 42 and 43 now resiliently engage the detent position formed by the next sequential pair of longitudinal grooves 28.

FIG. 11 is an enlarged end view along the line 11—11 of FIG. 7 showing the threaded receptacle 22 having an odd number of longitudinal grooves 28. Because of the odd number of longitudinal grooves 28, at one time only one spring member, 42 or 43, will engage a longitudinal groove 28 in threaded receptacle 22, while the circumferentially opposite spring member, 43 or 42, will engage a thread 24 of receptacle 22. In this fashion there are provided twice as many detent positions for one complete rotation of screw member 30, each detent position having only one (as opposed to two) spring member engaging a longitudinal groove 28.

FIG. 12a is a top plan view of screw member 30 threadably engaging threaded receptacle 22. Head end 38 is located a longitudinal distance L1 from threaded receptacle 22.

FIG. 12b is a top plan view of screw member 30 turned clockwise one detent position. Head end 38 is now located a longitudinal distance L2 from threaded receptacle 22. The change in the longitudinal position of screw member 30 within threaded receptacle 22 is defined as one longitudinal position increment ($\Delta L$) which is equal to L1–L2. If screw member 30 and threaded receptacle 22 have "N" threads per inch, and threaded receptacle 22 has "M" equally spaced longitudinal grooves 28, the longitudinal position of screw member 30 within threaded receptacle 22 is longitudinally adjustable according to the formula:

$$\Delta L = 1/(N \times M).$$

For example, if screw member 30 and threaded receptacle 22 have 32 threads per inch (N=32), and threaded receptacle 22 has 16 grooves 28 (M=16), then:

$$\Delta L = 1/(32 \times 16) = 0.00195 \text{ inches.}$$

In other words, rotation by one detent position (click) results in a change in the relative position of the screw member 30 and the threaded receptacle 22 of 0.00195 inches. It may be readily appreciated that by changing the number of threads per inch (N) or the number of longitudinal grooves (M), longitudinal position increments ($\Delta L$) may be reduced or increased to provide the desired adjustment precision.

FIG. 13 is a perspective view of positioning device 20 showing the change in the longitudinal position 60 and 62 of screw member 30 as the screw member 30 is rotated clockwise 64 or counterclockwise 66 respectively.

It may further be appreciated that while the figures show the screw member 30 moving into a fixed threaded receptacle 22, the converse could also apply wherein the threaded receptacle 22 moves about a fixed screw member 30.

Also it is noted that by increasing the thread diameter of the threads 24 of threaded receptacle 22, more grooves 28 can be placed around the circumference of the threads 24, thereby reducing ΔL and increasing the precision of positioning device 20.

In terms of fabrication, screw member 30 and threaded receptacle 22 of positioning device 20 are best constructed from wear resistant materials. Metal such as 13-8 CRES has been found useful, however a plastic or composite material could also be used. Spring member 42 may be fabricated from any resilient material. In a preferred embodiment, it is fashioned from piano wire sized to fit within slot 40. The resistance to rotating from a detent position may be increased by increasing the width (diameter) of spring member 42. Also, by adding additional through holes 47 and corresponding spring member pairs in screw member 30, the resistance to rotation may be increased.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A positioning device, comprising:

a threaded receptacle, said receptacle having first threads longitudinally extending around a first central axis;

said first threads having a plurality of circumferentially spaced longitudinal grooves;

a screw member having second threads sized to threadably engage said first threads of said threaded receptacle, said second threads longitudinally extending around a second central axis;

said screw member having a tip end for insertion into said threaded receptacle, and an opposite head end;

said second threads having an outer thread radius and an inner thread radius, said radii measured from said second central axis;

said screw member having at least one longitudinal slot penetrating said second threads, said slot having a bottom portion located at a bottom radius from said second central axis which is less than said inner thread radius;

an elongated spring member having a first end and an opposite second end, said first end fixedly positioned in said slot, said second end extending toward said head end of said screw member, said second end outwardly biased away from said second central axis;

said spring member having a radial width, said radial width equal to or less than the difference between said inner radius and said bottom radius;

so that when said screw member is rotatably inserted into and threadably engages said threaded receptacle, said spring member sequentially engages said spaced longitudinal grooves in incremental detent steps; and, said tip end of said screw member further including an integral elongated axial member oriented along said second axis.

* * * * *